United States Patent [19]

Brow et al.

[11] Patent Number: 4,917,279
[45] Date of Patent: Apr. 17, 1990

[54] UNDERHOOD TOOL BOX

[76] Inventors: Rebecca L. Brow; Philip R. Brow, P.O. Box 13, McMillan, Mich. 49853

[21] Appl. No.: 308,669

[22] Filed: Feb. 10, 1989

[51] Int. Cl.⁴ .............................................. B62D 43/00
[52] U.S. Cl. .............................. 224/42.14; 224/42.24; 206/373
[58] Field of Search ............... 224/42.13, 42.14, 42.16, 224/42.18, 42.19, 42.21, 42.24, 311, 315; 206/373; 70/63

[56] References Cited

U.S. PATENT DOCUMENTS

| | | | |
|---|---|---|---|
| 1,419,456 | 6/1922 | Johnson | 224/42.14 |
| 1,589,770 | 6/1926 | Trigg | 224/42.14 |
| 1,597,092 | 8/1926 | McTighe | 206/373 X |
| 1,684,160 | 9/1928 | Tinker | 224/42.14 |
| 1,945,123 | 1/1934 | Stiegler | 312/DIG. 33 X |
| 3,204,436 | 9/1965 | Nemsky | 70/63 |
| 3,321,117 | 5/1967 | Hedin | 312/DIG. 33 X |
| 4,227,737 | 10/1980 | Vogt | 296/76 |
| 4,832,193 | 5/1989 | Kime | 206/372 |

FOREIGN PATENT DOCUMENTS

| | | | |
|---|---|---|---|
| 611892 | 7/1926 | France | 224/42.14 |
| 79630 | 11/1955 | Netherlands | 224/42.13 |
| 618377 | 7/1980 | Switzerland | 206/373 |
| 2142888 | 1/1985 | United Kingdom | 224/273 |

Primary Examiner—Renee S. Luebke
Assistant Examiner—R. M. Fetsuga
Attorney, Agent, or Firm—Jerry T. Kearns

[57] ABSTRACT

A tool box adapted for mounting within the recessed wheel area of a spare tire stored in a horizontal position under the hood of a vehicle is formed from a cylindrical receptacle having a removable cover secured by a latching mechanism. The receptacle may have an interior floor portion provided with a bolt circle pattern of apertures for securing the receptacle to the wheel portion of the spare tire. The tool box may be provided with a locking cover and utilized to store valuable articles.

4 Claims, 5 Drawing Sheets

UNDERHOOD TOOL BOX

BACKGROUND OF THE INVENTION

1. Field of the Invention

The present invention relates to tool boxes, and more particularly pertains to a new and improved tool box adapted for mounting within a recessed wheel area of a spare tire stored under the hood of a vehicle. Modern compact cars frequently position the spare tire in a horizontal position beneath the hood of a vehicle. These compact cars have a relatively small interior and are frequently provided with a hatchback and thus have no trunk space. Storage of tool boxes and other valuable articles in an out of sight location within the interior of the vehicle is practically impossible, due to the lack of a trunk space. Most of these vehicles have an engine compartment covered by a hood secured by a latch mechanism with an internal release. The area under the hood is not customarily utilized for the storage of articles and thus commonly escapes the attention of car thieves. The present invention seeks to utilize these factors by providing a tool box dimensioned for storage within the recessed wheel area of the underhood vehicle spare tire. The tool box may be utilized for the storage of expensive tools and may be provided with a locking cover and utilized for storage of other valuable articles.

2. Description of the Prior Art

Various types of tool boxes are known in the prior art. A typical example of an underhood tool box is to be found in U.S. Pat. No. 4,136,904, which issued to C. Lauderdale on Jan. 30, 1979. This patent discloses a tool compartment adapted to be affixed under the hood of vehicles to the internal surface of the fender wheel cover and includes an elongated body having a hinged cover. The cover is provided with an electric light which is activated upon opening of the cover and an electrical receptacle is provided for use with external appliances. U.S. Pat. No. 4,179,153, which issued to B. Cole on Dec. 18, 1979, discloses a tool box for mounting under the hood of an automobile having a truck type front. A window washing bottle normally connected to the side wall of the automobile is disconnected and a side of the tool box carrying apparatus is connected in the location where the window washing bottle was formerly connected. U.S. Pat. No. 4,384,663, which issued to M. Williams on May 24, 1983, discloses a tool box mounted in the fender area over the wheel of a trailer. U.S. Pat. No. 4,416,483, which issued to A. Koch on Nov. 22, 1983, discloses an arrangement for storing tools in the trunk of a vehicle which utilizes a wall element at an inner surface of the trunk cover pivotable between open and closed positions to provide a storage receptacle. U.S. Pat. No. 4,660,880, which issued to W. Bensch on Apr. 28, 1987, discloses an underhood tool box for vehicles which is mounted adjacent the interior side of a front quarter panel over the curved surface of the fender well.

While the above mentioned devices are suited for their intended usage, none of these devices are adapted for mounting within the recessed wheel area of a horizontally positioned spare tire stored beneath the hood of a vehicle. Additionally, none of these prior art tool boxes include a bolt circle pattern dimensioned for securement to the wheel of a horizontally stored vehicle spare tire. Inasmuch as the art is relatively crowded with respect to these various types of tool boxes, it can be appreciated that there is a continuing nee for and interest in improvements to such tool boxes, and in this respect, the present invention addresses this need and interest.

SUMMARY OF THE INVENTION

In view of the foregoing disadvantages inherent in the known types of tool boxes now present in the prior art, the present invention provides an improved underhood tool box. As such, the general purpose of the present invention, which will be described subsequently in greater detail, is to provide a new and improved underhood tool box which has all the advantages of the prior art tool boxes and none of the disadvantages.

To attain this, representative embodiments of the concepts of the present invention are illustrated in the drawings and make use of a tool box adapted for mounting within the recessed wheel area of a spare tire stored in a horizontal position under the hood of a vehicle is formed from a cylindrical receptacle having a removable cover secured by a latching mechanism. The receptacle may have an interior floor portion provided with a bolt circle pattern of apertures for securing the receptacle to the wheel portion of the spare tire. The tool box may be provided with a locking cover and utilized to store valuable articles.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved underhood tool box which has all the advantages of the prior art tool boxes and none of the disadvantages.

It is another object of the present invention to provide a new and improved underhood tool box which may be easily and efficiently manufactured and marketed.

It is a further object of the present invention to provide a new and improved underhood tool box which is of a durable and reliable construction.

An even further object of the present invention is to provide a new and improved underhood tool box which is susceptible of a low cost of manufacture with regard to both materials and labor, and which accordingly is then susceptible of low prices of sale to the consuming public, thereby making such tool boxes economically available to the buying public.

Still yet another object of the present invention is to provide a new and improved underhood tool box which provides in the apparatuses and methods of the prior art some of the advantages thereof, while simultaneously overcoming some of the disadvantages normally associated therewith.

Still another object of the present invention is to provide a new and improved underhood tool box adapted for mounting in the recessed wheel area of a spare tire stored in a horizontal position beneath the hood of a vehicle.

Yet another object of the present invention is to provide a new and improved underhood tool box for enabling the secure storage of tools and other valuable articles and compact vehicles.

Even still another object of the present invention is to provide a new and improved underhood tool box which includes a locking cover enabling the storage of valuable articles beneath the hood of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
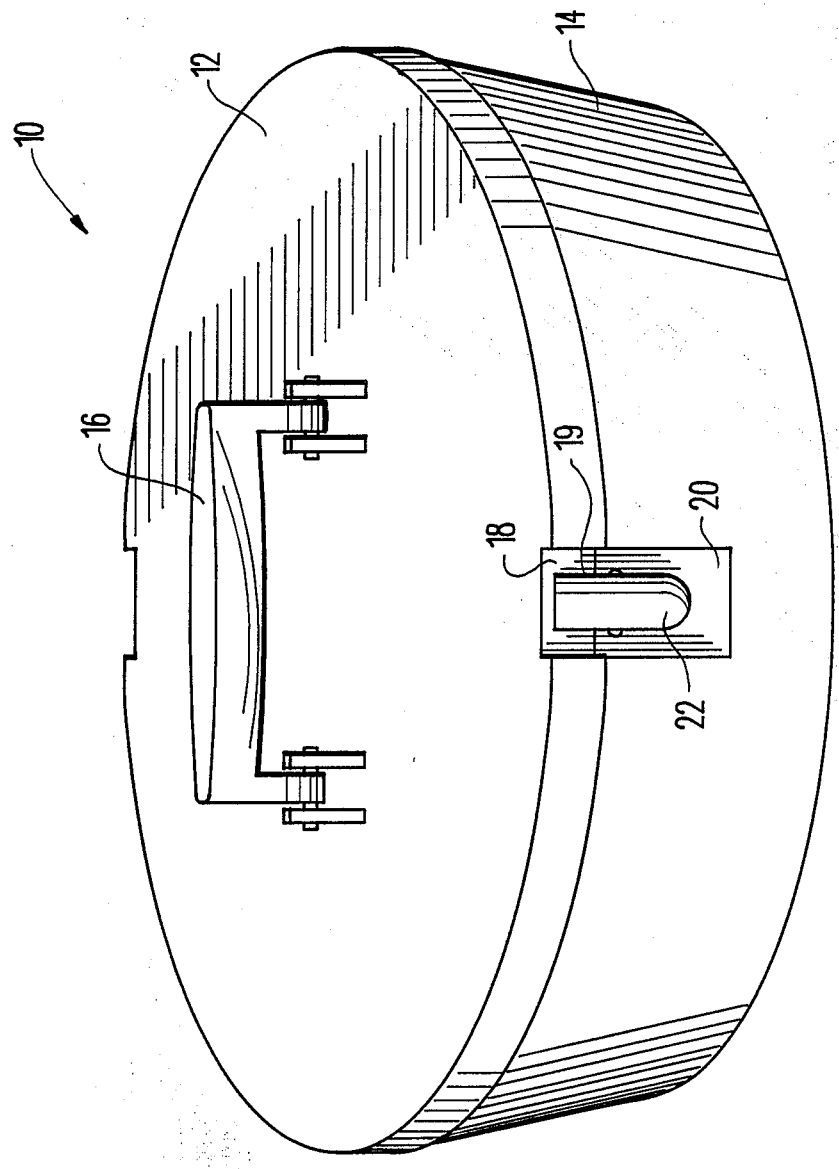
FIG. 1 is a perspective view of the underhood tool box according to the first embodiment of the present invention.

With reference now to the drawings, and in particular to FIG. 1 thereof, a new and improved underhood tool box embodying the principles and concepts of the present invention and generally designated by the reference numeral 10 will be described.

More specifically, it will be noted that the first embodiment 10 of the invention includes a cylindrical receptacle 14 having a circular cover 12. A handle 16 is provided on the exterior surface of the cover 12. A pair of recesses 18 are provided at diametrically opposed locations on the cover 12. Each of the recesses 18 is provided with a projecting rib 19 for cooperation with a pivotal latch member 22 mounted within a recess 20 in the side wall of the receptacle 14.

Figure 2:
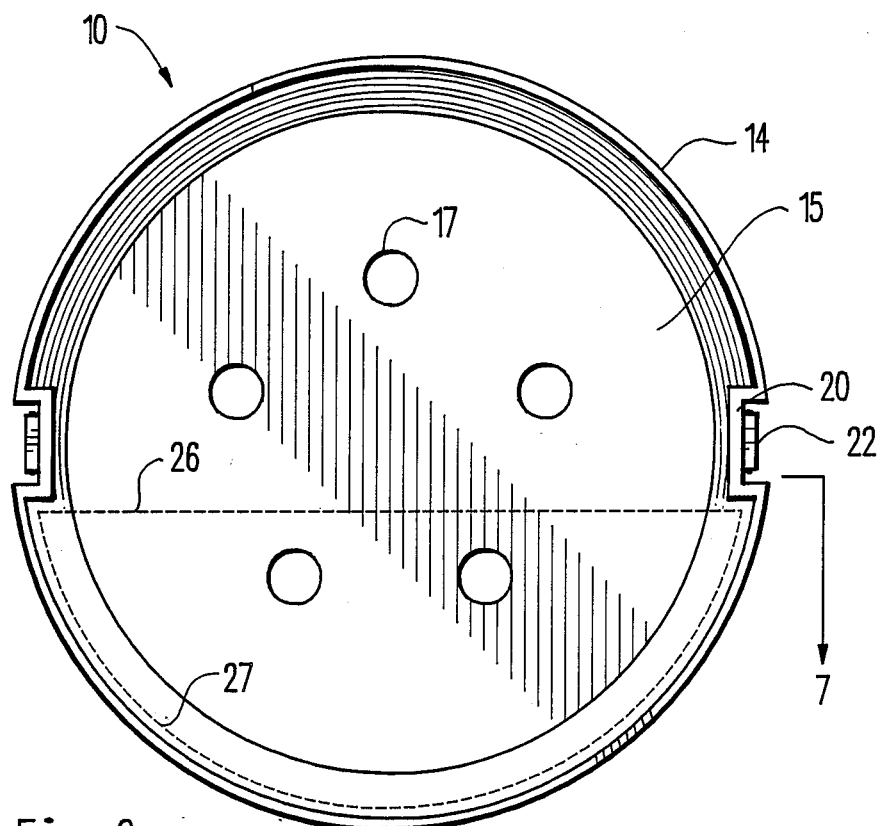
FIG. 2 is a top plan view illustrating the tool box with the cover removed.

FIG. 2 provides a top plan view which illustrates the receptacle 14 with the cover removed. The interior floor 15 of the receptacle 14 is provided with a plurality of circular apertures 17 arranged in a bolt circle pattern dimensioned for registry with the standard bolt circle pattern formed on a vehicle wheel. The receptacle 14 has a diameter dimensioned to be received within the recessed wheel area of a conventional spare tire mounted under the hood of a vehicle in a horizontal storage position. A vehicle which employs the conventional type of spare tire storage is sold in the U.S. under the trademark YUGO. Thus, by use of the conventional vehicle lug nuts and spare tire mounting studs, the tool box 10 may be secured within the recessed wheel area of the horizontally stored spare tire. This arrangement makes use of previously wasted space within the compact vehicle.

Figure 3:
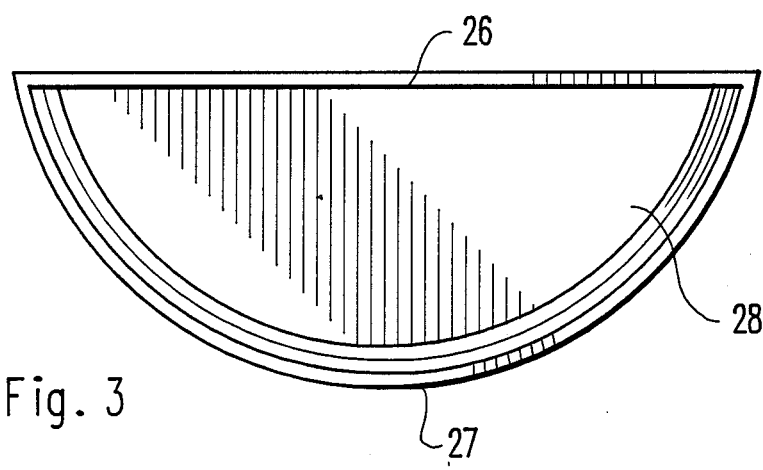
FIG. 3 is a top plan view illustrating a removable storage tray utilized with the tool box.

As shown in FIG. 3, a semi-circular storage tray is provided for selective removable storage within the receptacle 14 illustrated in FIG. 2. The removable storage tray has an interior compartment 28 defined by a first planar side wall 26 and a second semi-cylindrical side wall 27. The storage tray is dimensioned for location within the receptacle 14 as illustrated by the dotted lines in FIG. 2. The interior side wall portions of the diametrically opposed recesses 20 form locating surfaces for the removable storage tray. It is contemplated that one or a pair of the removable trays may be utilized with the receptacle 14.

Figure 4:
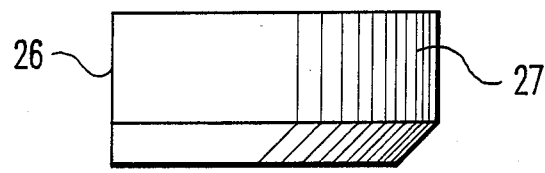
FIG. 4 is an end view of the removable storage tray.

FIG. 4 depicts an end view of the removable storage tray.

Figure 5:
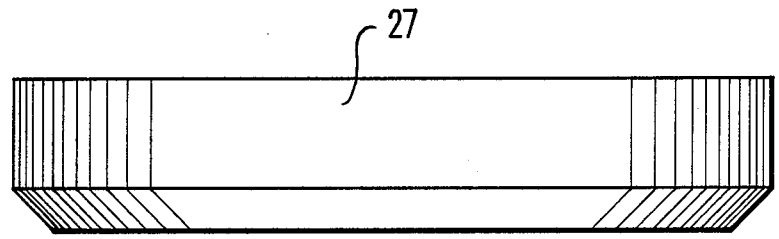
FIG. 5 is a side view of the removable storage tray.

FIG. 5 illustrates the semi-cylindrical side wall 27 of the removable storage tray.

Figure 6:
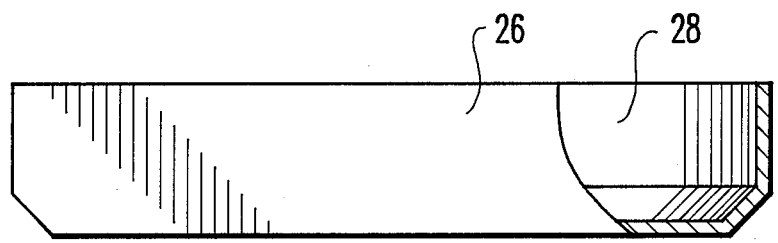
FIG. 6 is an opposite side view of the removable storage tray.

FIG. 6 illustrates the planar side wall 26 of the removable storage tray, partially cut away to illustrate the interior compartment 28.

Figure 7:
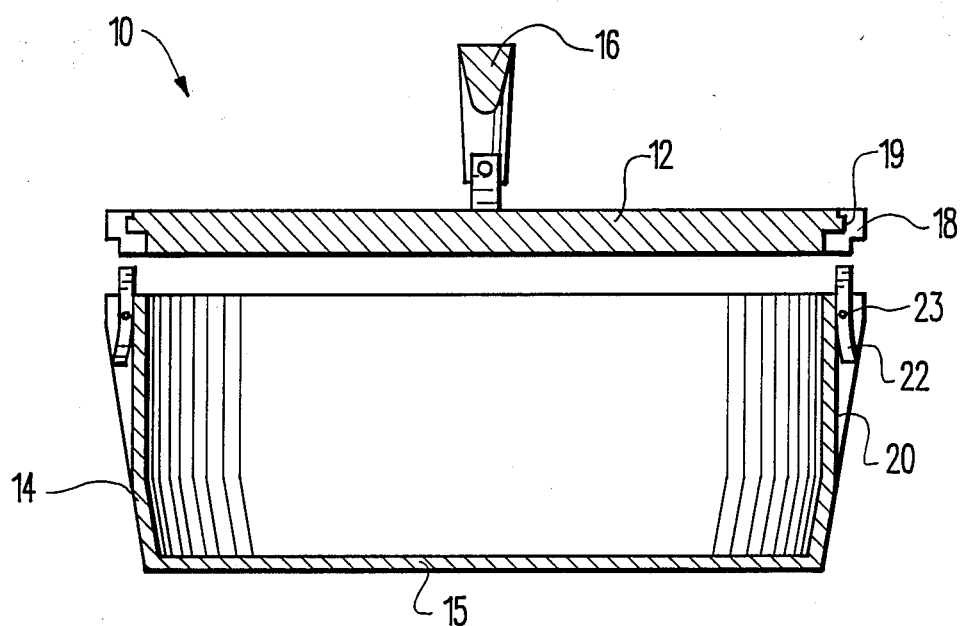
FIG. 7 is a cross sectional view, taken along line 7 of FIG. 2, illustrating the latch mechanism for securing the cover of the tool box.

FIG. 7 is a cross sectional view, taken along line 7 of FIG. 2, which illustrates the latching mechanism for securing the circular cover 12 on the cylindrical receptacle 14. As previously described, a pair of elongated latch members 22 are pivotally mounted within a pair of diametrically opposed recesses 20 formed in the cylindrical side wall of the receptacle 14. An additional pair of diametrically opposed recesses 18 are provided in the periphery of the circular cover 12. A projecting rib 19 is formed within each of the recesses 18, for cooperation with the latch member 22, in a manner to be described subsequently.

Figure 8:
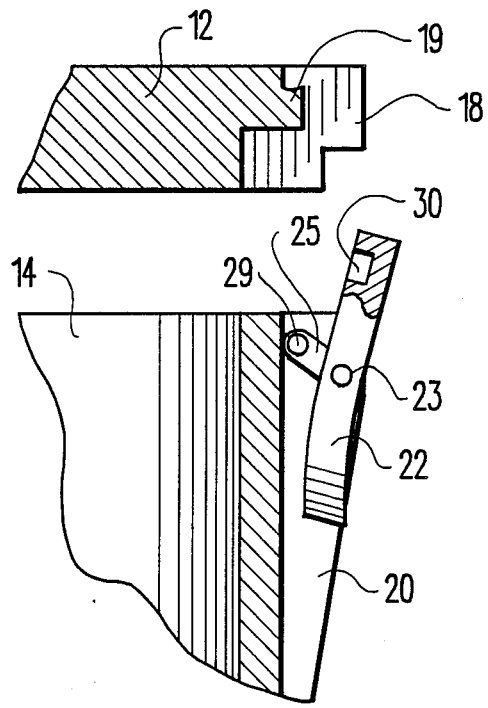
FIG. 8 is an enlarged detail view, partially in cross section, further illustrating the latch mechanism.

FIG. 8 provides an enlarged cross sectional detail view which illustrates the upper portion of the elongated latch member 22 partially in cross section. A recess 30 is formed in the upper end of the latch member 22 and is dimensioned for engagement with the projecting rib 19 on the cover 12. The latch member 22 is secured by a pivot pin 23 to a connecting link 25 which is secured to the receptacle 14 by a pivot pin 29. To secure the cover 12 in a closed position, the latch member 22 and connecting link 25 are pivoted upwardly and the recess 30 is placed into engagement with the rib 19. The diametrically opposed latch members 22 are then urged downwardly and the pivoting link 25 secures the latch member 22 in a locked position, in the manner of an over-center type clamp.

Figure 9:
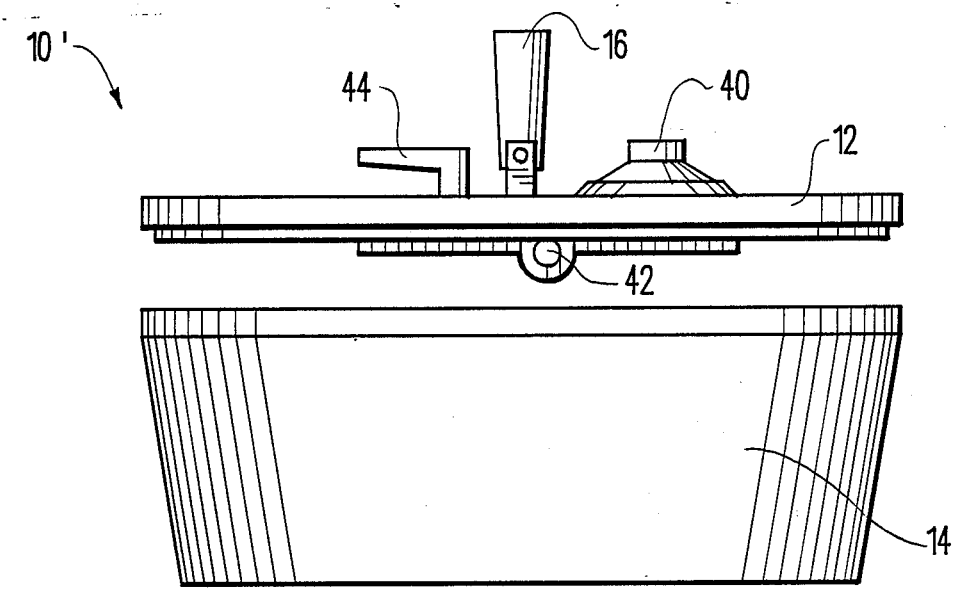
FIG. 9 is a side view illustrating an alternative tool box cover locking mechanism according to the second embodiment of the present invention.

FIG. 9 illustrates an alternative locking mechanism which may be utilized to secure the cover 12 on the receptacle 14 in the second embodiment 10' of the present invention. A conventional combination type lock 40 is mounted on the upper exterior surface of the cover 12. The locking mechanism 40 includes a lever 44 which, when in an unlocked position, may be turned to retract a pair of diametrically opposed pins 42. The pins 42 are disposed for selective engagement with diametrically opposed circular apertures provided in the interior side wall portion of the receptacle 14. This locking arrangement is similar to that utilized on portable safes.

Figure 10:
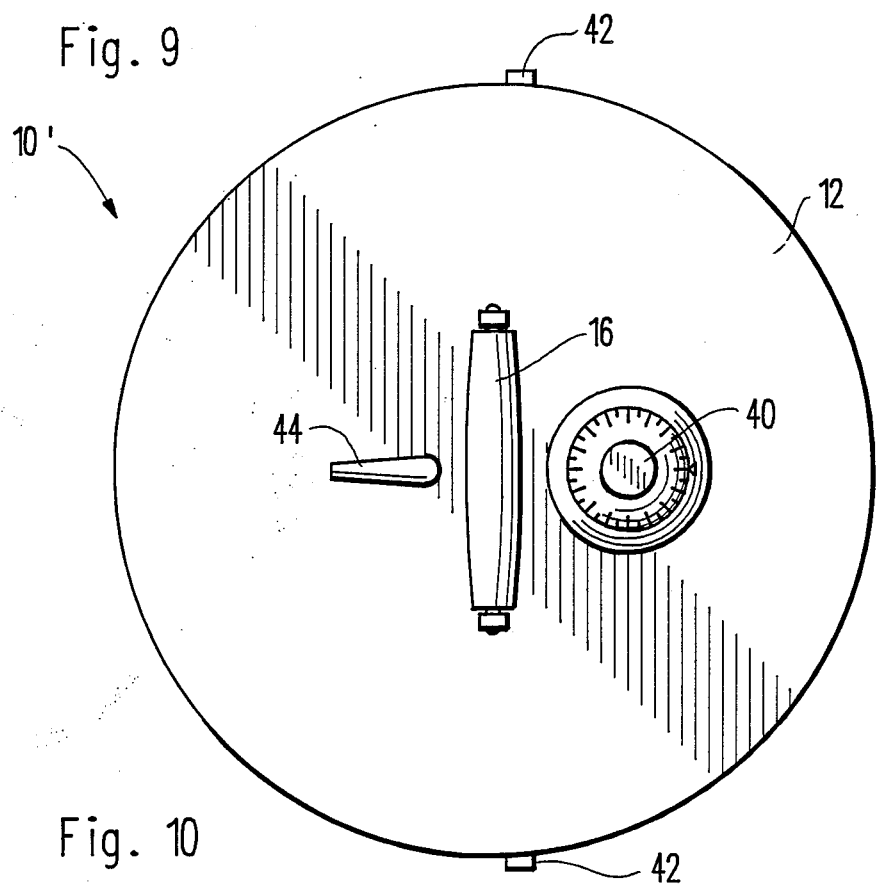
FIG. 10 is a top plan view of the tool box of FIG. 9.

FIG. 10 illustrates a top plan view of the cover 12. It is contemplated that the cover 12 and the underlying receptacle 14 will be formed from a relatively heavy gage metal which, in conjunction with the combination lock 40, will provide a high degree of security and allow the storage of valuable articles under the hood of a vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. An underhood tool box adapted to be received within the wheel portion of a horizontally disposed spare tire mounted under the hood of a vehicle, comprising:
    a cylindrical receptacle dimensioned to be received within a central recessed wheel portion of a spare tire, and having an open top end;
    a circular cover for said open top of said receptacle;
    a pair of diametrically opposed recesses formed in said receptacle;
    a pair of latches located in said recesses for selectively securing said cover on said receptacle;
    at least one semi-circular storage tray dimensioned for receipt in said receptacle;
    and
    said tray having a planar side wall portion retained in proper orientation within said receptacle by abutment with interior side wall portions of said recesses.

2. The underhood tool box of claim 1, further comprising securing means for securing said receptacle to a spare tire.

3. The underhood tool box of claim 2, wherein said securing means comprises a bolt circle pattern of apertures formed in a bottom floor of said receptacle for registry with a bolt circle of a spare tire.

4. The underhood tool box of claim 1, wherein each of said latches comprise:
    an elongated member pivotally mounted by a connecting link within one of said recesses;
    said cover having a projecting rib;
    and
    said elongated member having a recess for engagement with said rib.

* * * * *